(12) United States Patent
Cummings et al.

(10) Patent No.: US 9,415,986 B2
(45) Date of Patent: Aug. 16, 2016

(54) SAFETY DEVICE

(71) Applicant: BLUESKY SOLUTIONS LIMITED, Lutterworth (GB)

(72) Inventors: Paul Cummings, Souldern (GB); Kevin Jonathan Gale, Marlow (GB)

(73) Assignee: BLUESKY SOLUTIONS LIMITED, Lutterworth (GB)

( * ) Notice: Subject to any disclaimer, the term of this patent is extended or adjusted under 35 U.S.C. 154(b) by 0 days.

(21) Appl. No.: 14/872,593

(22) Filed: Oct. 1, 2015

(65) Prior Publication Data

US 2016/0099122 A1 Apr. 7, 2016

(30) Foreign Application Priority Data

Oct. 2, 2014 (GB) .................................. 1417421.3

(51) Int. Cl.
*H02H 11/00* (2006.01)
*B66F 17/00* (2006.01)
*B66F 11/04* (2006.01)

(52) U.S. Cl.
CPC ............. *B66F 17/006* (2013.01); *B66F 11/046* (2013.01)

(58) Field of Classification Search
CPC ............................. B66F 11/046; B66F 17/006
See application file for complete search history.

(56) References Cited

U.S. PATENT DOCUMENTS 6,595,330 B1 * 7/2003 Henrickson ........... B66F 9/0655 187/223
9,193,573 B1 * 11/2015 Troy ....................... B66F 7/065
2005/0187712 A1 8/2005 Callaghan et al.
2007/0084450 A1 * 4/2007 Oka ....................... B60K 28/08 123/675
2009/0260920 A1 * 10/2009 Cummings ........... B66F 11/046 182/18
2010/0133043 A1 6/2010 Black et al.
2012/0160604 A1 6/2012 Bowden
2013/0233645 A1 9/2013 Hao et al.
2014/0021912 A1 * 1/2014 Martin .................. B60L 11/182 320/109

FOREIGN PATENT DOCUMENTS

CN 102120556 7/2011
CN 202030492 U 11/2011
EP 1 026 120 8/2000
EP 2 096 078 9/2009
FR 2836468 10/2004
GB 2 481 709 1/2012
GB 2 495 158 4/2013
JP 2011-063352 3/2011

(Continued)

OTHER PUBLICATIONS

United Kingdom Search Report for British Patent Application No. GB1417421.3, issued Mar. 18, 2015, 3 pages.

(Continued)

*Primary Examiner* — Daniel Cavallari
(74) *Attorney, Agent, or Firm* — Foley & Lardner LLP

(57) ABSTRACT

A safety device for an aerial lift having a basket or cage with controls which permit an operator standing in the basket or cage to maneuver it. The safety device comprises a control module which is programmed to prevent movement of the basket or cage and activate an alarm by cutting electrical supply to a function enable switch and, if the electrical supply to the function enable switch cannot be cut, the control module is further programmed to prevent movement of the basket or cage and activate the alarm by operating an emergency switch to cut the electrical supply.

18 Claims, 5 Drawing Sheets

(56) References Cited

FOREIGN PATENT DOCUMENTS

| | | | | |
|---|---|---|---|---|
| JP | 2013-010589 | | 1/2013 | |
| WO | WO-2012/001353 | | 1/2012 | |
| WO | WO-2013/093395 | | 6/2013 | |
| WO | WO 2013/93395 | | 6/2013 | |
| WO | WO 2013093395 | A1 * | 6/2013 | .............. B66F 11/04 |

OTHER PUBLICATIONS

United Kingdom Search Report for British Patent Application No. GB 1417426.2, issued Mar. 18, 2015, 4 pages.

U.S. Appl. No. 14/872,579, Oct. 1, 2015, Cummings, Paul.

International Search Report and Written Opinion for PCT/GB2015/052856, issued Feb. 2, 2016, 13 pages.

* cited by examiner

SAFETY DEVICE

CROSS-REFERENCE TO RELATED PATENT APPLICATION

This application claims priority to United Kingdom Patent Application No. 1417421.3, filed Oct. 2, 2014, the contents of which are hereby incorporated by reference in its entirety.

FIELD OF THE INVENTION

The present disclosure relates to a safety device for aerial lifts and an aerial lift comprising the same.

BACKGROUND TO THE INVENTION

Aerial lifts are frequently employed for lifting operatives to elevated working sites, for example to install overhead pipe work during building construction. A typical aerial lift may comprise a mobile elevated work platform (MEWP) having an extendable boom which has an elevator basket or cage for housing operatives securely to the end of the boom. Alternative aerial lifts may comprise a MEWP having an extendable scissor lift which has an elevator basket or cage for housing operatives securely to the end of the scissor lift.

The basket or cage generally contains a control panel which permits an operative standing in the basket or cage to manoeuvre the work platform as desired. The aerial lift may be powered using hydraulics powered by the MEWP's engine.

The control panel generally features an emergency stop switch and a function enable switch which needs to be operated before the controls can be operated. In boom lifts the function enable switch is typically a footswitch which must be depressed to activate the controls. In scissor lifts the function enable is typically a dead man's handle. If the function enable switch is released, the basket or cage is prevented from moving immediately, but the MEWP's engine (which powers the hydraulics) continues to run. If the emergency stop switch is activated then both the basket is prevented from moving and, in most cases, the MEWP's engine is stopped.

Unfortunately it is known that operators standing at the control panel of the aerial lift can become trapped between the basket and an obstacle before they can either release the function enable switch or activate the emergency stop. This is known as an entrapment event. Accidents of this nature can be fatal since the operator can be crushed.

The present applicants have previously described a safety device comprising a tensioned cord or wire (EP2096078B1) and an improved system comprising a pressure sensitive safety edge (WO2012/001353). Activation of the safety device, which is located proximate to the control panel, prevents movement of the basket or cage by overriding the function enable switch. The effect being equivalent to the operative having released the function enable switch. A further improvement was disclosed in WO2013/093395 whereby the safety device is not "live" until the operator activates the function enable switch.

In each of the prior art safety devices it is possible for the relays in the function enable switch to become "welded". That is, they do not respond to the safety device signal, thereby rendering the safety device non-functional. Clearly, this represents a danger to the operator.

The present applicants have overcome this problem by employing a backup safety system in the safety device of the present disclosure.

SUMMARY OF THE INVENTION

According to a first aspect there is provided a safety device for an aerial lift having a basket or cage with controls which permit an operator standing in the basket or cage to manoeuvre it, the controls comprising an emergency switch which normally allows the flow of electricity and is operable to cut electrical supply and prevent movement of the basket or cage, and a function enable switch which is normally open to stop electrical supply and prevent movement of the basket or cage and must be held closed by the operator to allow the flow of electricity and enable the operator to operate the controls; the safety device comprising at least the following components: an alarm which is either audible, visual or audible and visual, a switch activation device proximate to the controls, a first relay connected to the emergency switch, a second relay connected to the function enable switch, the first and second relays being controlled by a programmable control module connected to the switch activation device, function enable switch and alarm; wherein the control module is programmed to prevent movement of the basket or cage and activate the alarm by cutting electrical supply to the function enable switch when the function enable switch is closed and the switch activation device is activated, and wherein if the electrical supply to the function enable switch cannot be cut, the control module is further programmed to prevent movement of the basket or cage and activate the alarm by operating the emergency switch to cut the electrical supply.

Advantageously, in the event that the first mechanism fails to prevent movement of the basket using the function enable switch, a second mechanism is implemented to prevent movement of the basket using the emergency stop. As described above, activation of the emergency switch cuts power to both the basket and the MEWP's engine.

The switch activation device may comprise any suitable device, including but not limited to a tensioned cord or wire, a moveable bar, a laser or light beam or proximity sensor or a pressure sensitive safety edge such as a Mayser IP 65 or those provided by Tapeswitch Ltd.

In a second aspect of the invention there is provided an aerial lift comprising a safety device according to the present disclosure.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION

There will now be described, by way of example, a specific mode contemplated by the inventors. In the following description numerous specific details are set forth in order to provide a thorough understanding. It will be apparent however, to one skilled in the art, that the present invention may be practiced without limitation to these specific details.

Figure 1A:
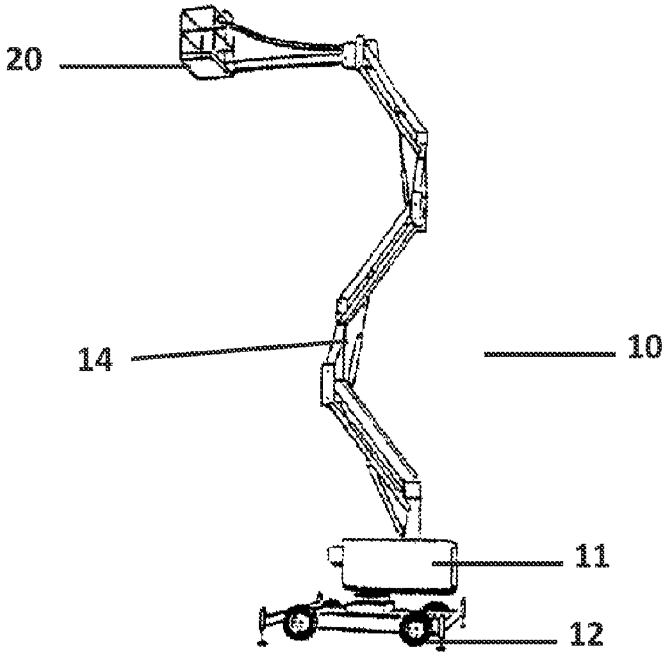
FIG. 1A shows a MEWP with an extendable boom.
Figure 1B:
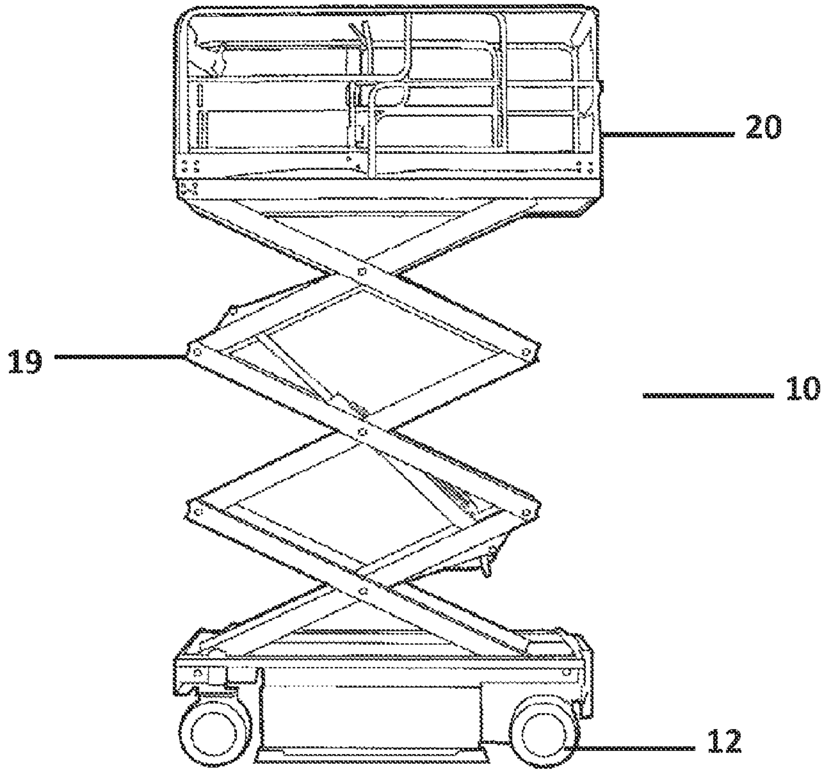
FIG. 1B shows a MEWP with a scissor lift.

FIGS. 1A and 1B

With reference to FIG. 1A, there is shown a mobile elevated work platform (MEWP) 10 in the form of a self drive mobile lift of any suitable type. The MEWP 10 has a drivable vehicle body 11 having wheels 12 and an extendable boom 14. A basket 20 or cage is mounted on the free end of the boom 14 and the basket 20, in use, can be raised or lowered and generally manoeuvred relative to the ground as is well known. The basket 20 is shown in a raised condition. The boom 14 is raised, lowered, extended, rotated etc. by any suitable means, typically operated by a powered hydraulic system provided on the vehicle body 11 and powered by the vehicle engine. The boom 14 may be provided with a load sensor which senses the total load on the boom 14.

With reference to FIG. 1B, there is shown a MEWP 10 in the form of a scissor lift, having wheels 12, an extendable scissor lift 19 and a basket of cage 20 mounted on the free end of the scissor lift. In use, the basket or cage can be raised or lowered relative to the ground.

FIG. 2

Figure 2:
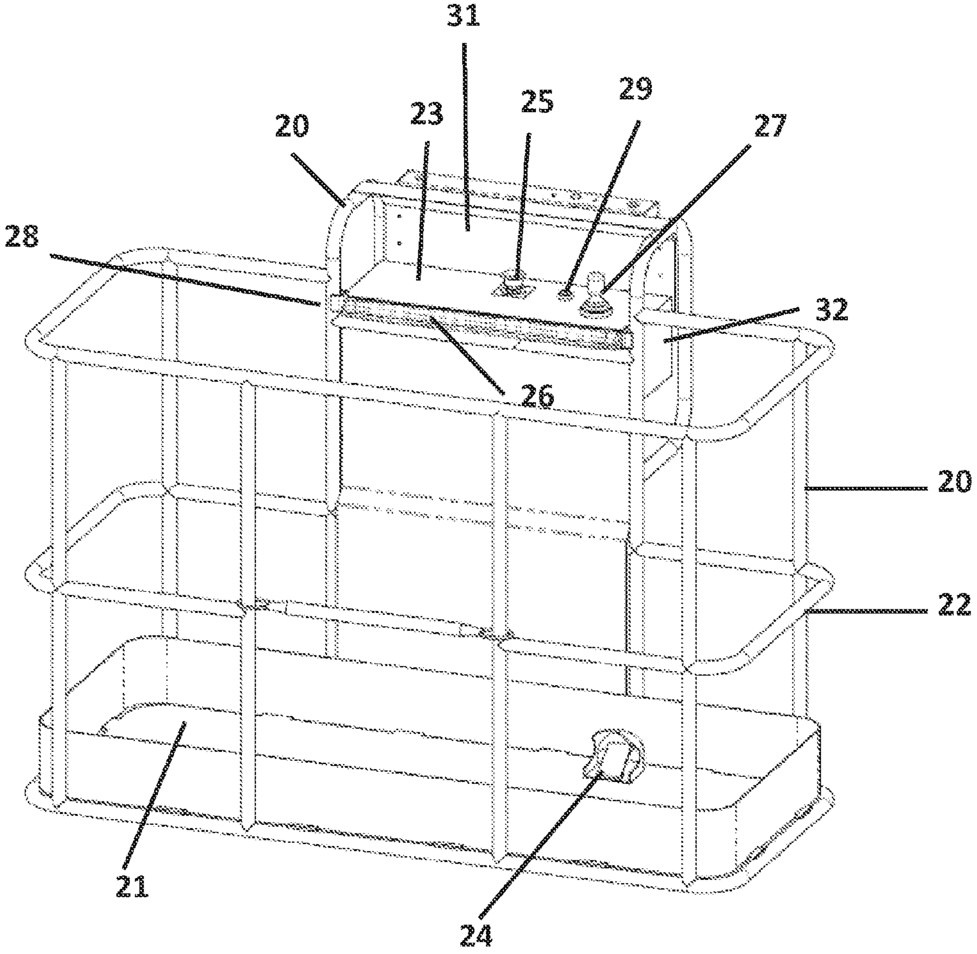
FIG. 2 shows an isometric view of a basket or cage having a safety device, a pressure sensitive safety edge switch activation device and a switch activation device reset switch.

With reference to FIG. 2 there is shown a basket or cage 20 having a floor 21 and surrounded by a safety barrier 22. The basket or cage is provided with controls 23, shown as a control panel, which typically feature one or more control levers 27 whereby an operator standing in the basket or cage can manoeuvre the basket to a desired location. The controls may also comprise a function enable switch shown as a foot switch 24 which must be closed (depressed) by the operator before the controls are operational. Where the foot switch is not depressed movement of the basket ceases immediately although the MEWP's engine (which powers the basket) usually continues to run.

An emergency stop switch 25 is shown on the controls which also ceases movement of the basket when activated. For most models of MEWP, the emergency stop switch simultaneously shuts down the MEWP's engine.

The control panel may be partially protected by protection bars 30 and a back plate 31. The electronics of the controls are typically housed directly beneath the control panel in a control box 32. Advantageously, the control module of the safety device of the present disclosure is dimensioned such that it can also be housed within the control box.

The basket is further provided with a switch activation device 26 shown as a pressure sensitive safety edge proximate to the controls. A safety edge can be classified as a "trip" device. In general a safety edge or safety bumper is particularly suitable for use on machines which stop immediately after removal of power. A typical safety edge consists of an aluminium rail, a safety contact, and a safety contact strip. The special shape of the safety edge (rubber profile) protects the safety contact strip from damage. As shown in FIG. 2, the switch activation device is held in place by a clamp 28 at each end.

FIG. 3A-D

Figure 3A:
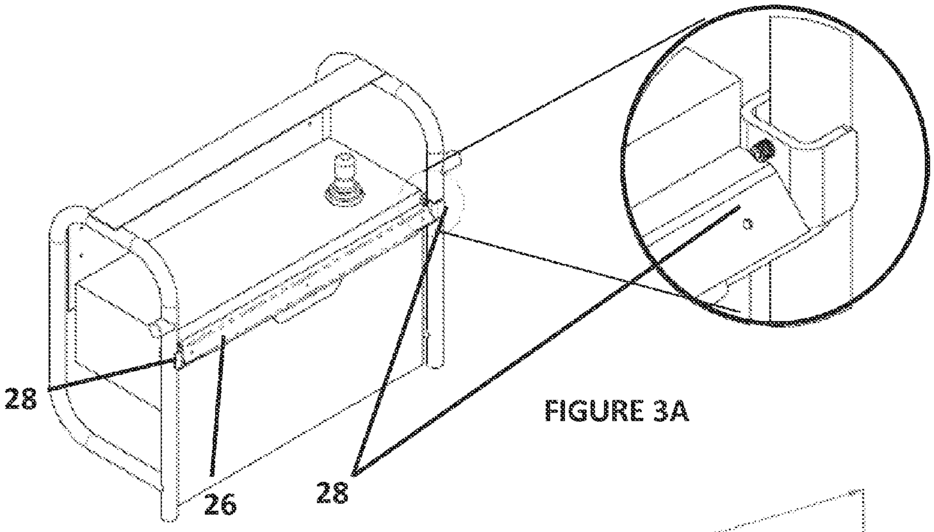
FIGS. 3A-3D show a variety of views of the switch activation device and the clamps that are used to attach the device to the basket or cage.

With reference to FIG. 3A there is shown a switch activation device 26 with a clamp 28 at each end and an expanded view of the clamp in situ.

Figure 3B:
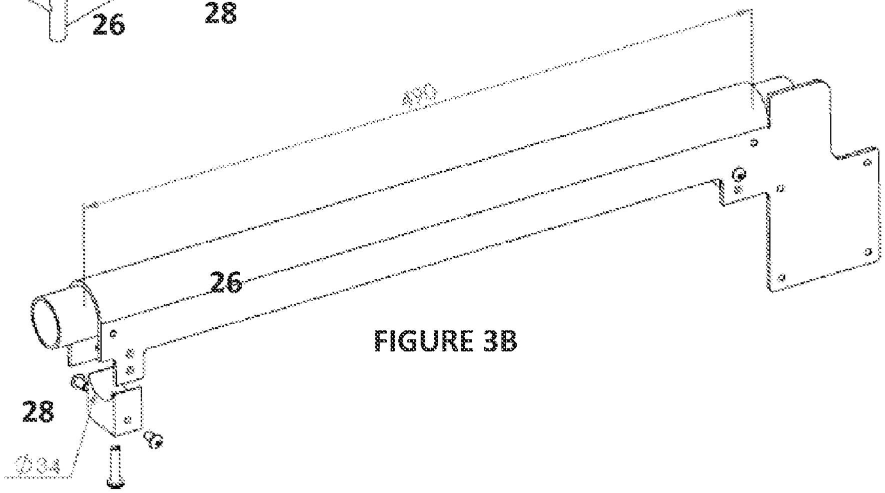

FIG. 3B shows a rear view of a switch activation device, that it, the side which is attached to the basket or cage, showing an exploded view of the attachment means, in this example a number of screws.

Figure 3C:
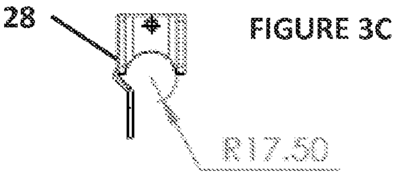

FIG. 3C shows a side view of a clamp 28.

Figure 3D:
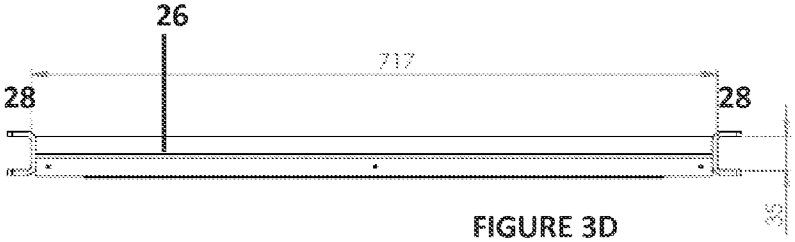

FIG. 3D shows a top view of a switch activation device 26 with clamps 28 at each end.

FIG. 4

Figure 4:
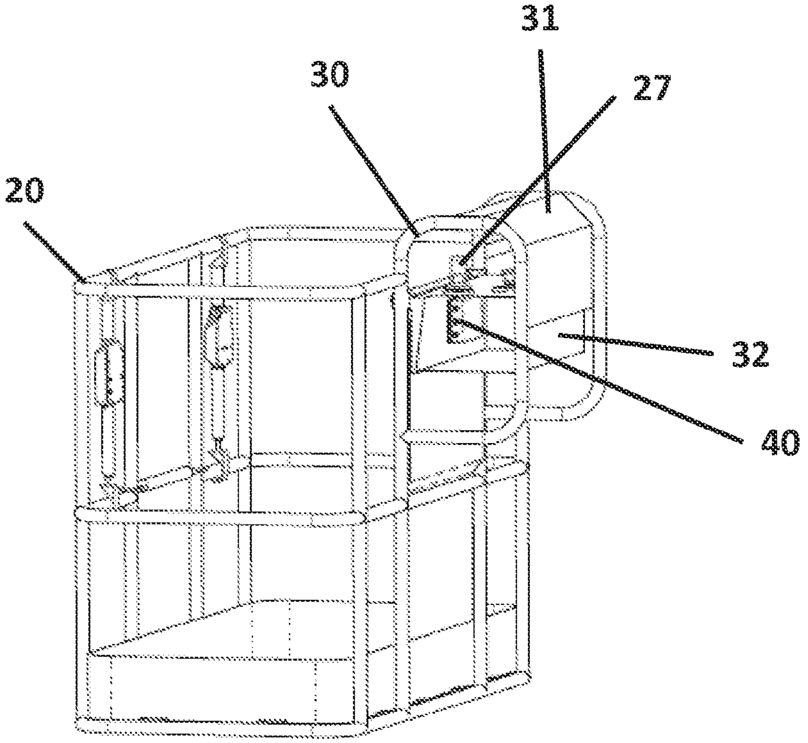
FIG. 4 shows an isometric view of the basket or cage of FIG. 2 with a cross section through the control box showing the control module of the safety device housed inside.

With reference to FIG. 4 there is shown a basket or cage 20 with a cross section taken through the control box 32. Inside the control box can be seen the control module 40 of the safety device of the present disclosure.

FIG. 5

Figure 5:
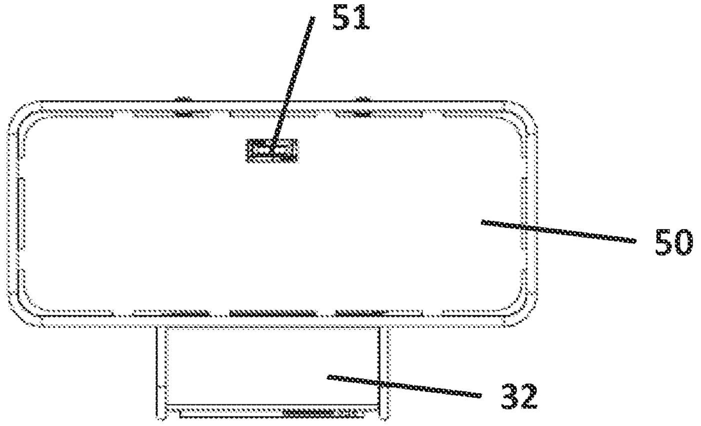
FIG. 5 shows the basket or cage of FIGS. 2 and 4 from underneath showing the under basket alarm.

With reference to FIG. 5 there is shown a view of the basket or cage 20 from underneath showing the underside of the basket or cage 50 and wherein the alarm 51 is mounted to the underside of the basket or cage.

FIG. 6

Figure 6:
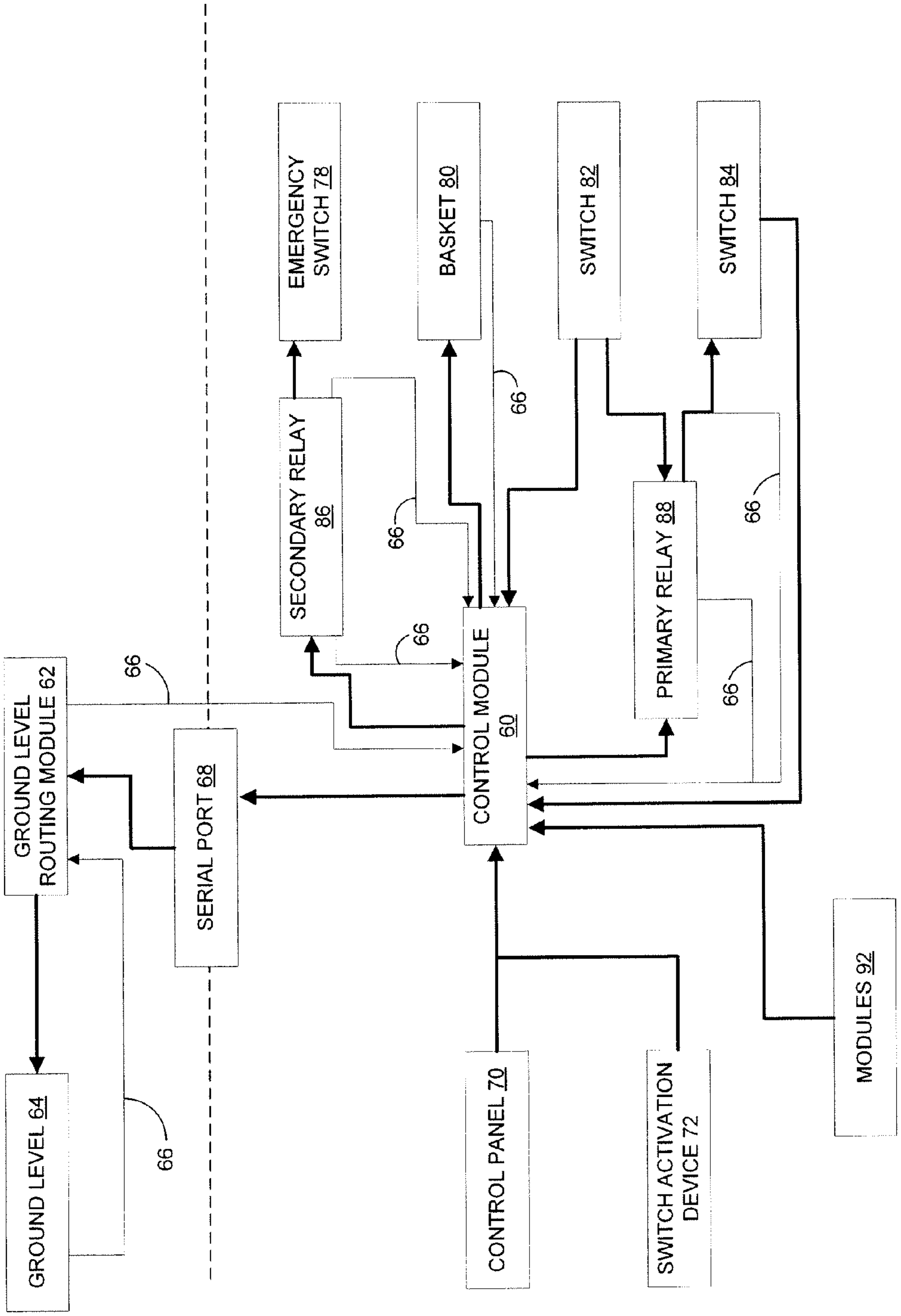
FIG. 6 shows a block type circuit diagram for connection of the safety device into safety switches of the aerial lift.

With reference to FIG. 6 there is shown a simplified circuit diagram for the safety device.

In use, the safety device is turned on when the MEWP is powered up and performs a self-diagnostic test via the ground level routing module 62. If the self-diagnostic test is failed the operator is alerted by means of an alarm. If the test is passed the safety device is functional.

When the aerial lift is operational the operator activates the function enable switch 82 which signals to the programmable control module 60 to monitor for entrapment events. If an entrapment event is detected by the switch activation device 72, a signal is sent to the control module 60 to tell it to cut power to the function enable switch 84 via a primary relay 88.

If the primary relay cannot cut power to the function enable switch a signal is sent via the control module to a secondary relay 86 which activates the emergency switch 78.

In addition, when an entrapment event is detected by the switch activation device 72, it further signals via the control module to activate the alarms under the basket 80 and at ground level 64. The ground level alarms are activated via a serial port 68 which is in communication with a ground level routing module 62.

The control panel 70 features a reset button which communicates with the control module 60 to override the alarm following accidental triggering of the switch activation device. For example, if pressed within 10 seconds of the triggering.

At each stage, error checking and fault reporting protocols 66 are in place to alert the operator that the safety device is not functional.

In the event that the function enable switch 82 is not activated, the switch activation device 72 is ignored.

The dashed line represents components that are at ground level (above the line) and at basket level (below the line).

Additional modules 92 can be connected to the control module if desired.

In the context of the present disclosure, safety device means a device for preventing or limiting the severity of entrapment events. That is, an accident in which an operator is struck by an object causing him to be pressed against the switch activation device in a potential crushing position.

In one embodiment the safety device is an anti-entrapment device. That is, a device to prevent entrapment events which potentially endanger the operator.

In one embodiment the safety device is not an anti-collision device. That is, the device is not designed to prevent collisions of the basket with surrounding obstacle.

As employed herein aerial lift refers to any form of powered extendable lift for enabling an operative to work at height, such as a MEWP, cherry picker or scissor lift. Aerial lift does not include a forklift truck or manually-powered (i.e. non-electrical) lifts.

Basket or cage as employed herein refers to a working platform with a safety barrier. The basket or cage is typically not enclosed overhead.

Controls as employed herein refers to the entirety of the controls via which the operator can manoeuvre the basket or cage including the control lever on the control panel and the function enable switch.

Emergency switch as employed herein a switch or button which, when activated, cuts all power to the MEWP, overriding all other controls and preventing further movement of the basket or cage.

Allows the flow of electricity as employed herein refers to a closed (complete) circuit wherein electricity is free to move, completing the circuit and allowing power to be supplied to the controls of the basket or cage. That is, the controls of the basket or cage are “live” and can be used to manoeuvre the basket or cage.

Stop (or cut) electrical supply as employed herein means that the circuit is open (broken), power is not supplied to the controls of the basket or cage and therefore the basket or cage cannot be moved.

Prevent movement as employed herein means that the basket or cage cannot be manoeuvred. Typically this is due to the controls not receiving power either because the function enable switch is not activated or because the emergency switch has been activated.

Function enable switch as employed herein means a switch which must be activated for the controls to be live or functional. For example, a foot switch must be depressed or a dead man’s handle must be held closed.

In one embodiment the function enable switch is a foot switch or a dead man’s handle.

Foot switch as employed herein refers to a switch, typically at ground level (that is, the ground or floor of the basket or cage), which is designed to be activated, generally this means the switch is depressed, by the operator in order to make the controls live or functional. Without the foot switch being depressed, the controls are not functional and the basket or cage cannot be moved.

Dead man’s handle as employed herein refers to a switch, generally a lever, which acts as a safety device by shutting off power when not held in place (held closed) by the operator.

Held closed by the operator as employed here refers to any function enable switch which is held in the closed position, that is, the position which enables the flow of electricity. Examples include, but are not limited to, a foot switch which is depressed and a dead man’s handle which is held in the active position.

In one embodiment the safety device is only functional when the function enable device is activated.

Alarm as employed herein refers to any alerting system designed to draw attention to a specific problem or danger. Alarms can be visual, audible, tactile (e.g. such as vibration alert) or any other type of alarm.

In one embodiment the alarm is tactile.

Audible as employed herein refers to an alarm which can be heard, for example, a klaxon or horn. Suitable horns may be those already installed in the MEWP vehicle, similar to a car horn. Alternatively the audible alarm may be a separate unit provided as part of the safety device.

Generally an audible alarm will be at least 95 decibels, for example at least 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129 or 130 decibels, such as approximately 105 decibels.

In one embodiment the aerial lift has a horn and the alarm is an audible alarm which utilises the horn.

Horn as employed herein is a sound-making device used to warn others of a hazard, such as the approach of a vehicle or of its presence. Automobiles, trucks, ships, and trains are generally required by law to have horns.

Vehicle horns are often utilised as the alarm in car security alarms and in at least one embodiment of the present disclosure the vehicle horn is utilised as the alarm of the safety device.

In one embodiment the alarm or horn sounds a unique sounding pattern.

Unique sounding pattern as employed herein refers to a specific repeated activation of the alarm, for example is a Morse code SOS pattern—that is 3 short alarms followed by three long alarms followed by three short alarms to replicate the . . . - - - . . . of Morse code.

In one embodiment the alarm is linked to the horn via a serial communications connection, such as an RS232 lead.

RS232 as employed herein refers to a standard for serial communication transmission of data. It formally defines the signals connecting between a DTE (data terminal equipment) such as a computer terminal, and a DCE (data circuit-terminating equipment, originally defined as data communication equipment), such as a modem. The RS-232 standard is commonly used in computer serial ports. The standard defines the electrical characteristics and timing of signals, the meaning of signals, and the physical size and pinout of connectors.

In one embodiment the alarm is visual and flashes for a period of time when the safety device is activated.

Visual as employed herein refers to alarm which can be seen, such as a light or beacon. Typically a visual alarm will flash since it is known that a non-flashing alarm is less likely to attract attention.

Flashes as employed herein means repeatedly turning on and off. This can be in a regular or irregular pattern or can be arranged to send a message such as a Morse code SOS.

In one embodiment the alarm operates until the safety device is reset.

Generally visual alarms will be at least 50 lumens, such as approximately 60, 70, 80, 90, 100, 110, 120, 130, 140, 150, 160, 170, 180, 190, 200, 210, 220 230, 240, 250, 260 or 270 lumens, for example over 230 lumens, such as about 240 lumens.

In one embodiment the alarm is located on the underside of the basket or cage.

Underside as employed herein means the bottom or underneath. In use, the underside can be seen from the ground when the basket or cage is elevated.

Switch activation device as employed herein refers to a switch that activates, that is, triggers, the safety device to be deployed. All types of switch activation device are envisioned, including, but not limited to a tensioned cord or wire, a pressure sensitive safety edge, a safety bar, a laser or other beam or curtain of light which is activated when the beam is broken.

In one embodiment the switch activation device is a pressure sensitive safety edge.

Pressure sensitive safety edge as employed herein refers to a sensor, which may be offered as a normally open contact. Safety edges are typically flexible. If the moving part that includes the safety edge or safety bumper strikes an operator (or vice versa) the flexible safety edge is depressed under the applied load and will send a signal for movement to be stopped.

In one embodiment the pressure sensitive safety edge is held in position by a clamp, for example, as shown in FIGS. 3A-D.

Clamp as employed herein refers to a mechanical fastening arranged to hold the end of the safety edge in position.

Proximate to the controls as employed herein means very close to. In some situations proximate means integral to. That is, the safety activation device is very close to or a part of the controls.

In one embodiment the safety device of the present disclosure further comprises a switch activation device reset switch connected to the control module.

Reset switch as employed herein is a switch or button which can be used to override the activity of the safety activation device and ignore an accidental activation of the device. Typically the reset switch or button must be activated within 10 seconds of the accidental activation, for example within 1, 2, 3, 4, 5, 6, 7, 8 or 9 seconds. This period is known as the pre-emergency stage.

In one embodiment the reset switch is located on the aerial lift's controls. That is, the reset switch is integral to the control panel.

In one embodiment the reset switch is not located on the aerial lift's controls but is proximate to the controls.

In general the reset switch can be deployed during an initial "pre-emergency" stage following activation of the safety activation device. The pre-emergency stage is typically a period of up to 10 seconds.

In one embodiment during the pre-emergency stage the alarm has a different warning pattern.

In one embodiment during the pre-emergency stage the alarms warning pattern comprises up to 5 sounds, flashes or sounds and flashes in ten seconds, such as 1, 2, 3 or 4 flashes and/or sounds in 10 seconds, for example 3 flashes and/or sounds. In one embodiment if the reset button is not deployed the full alarm is activated and movement is prevented.

In one embodiment movement is prevented immediately the safety device is triggered but may be overridden in the pre-emergency stage.

In one embodiment the safety device must be restarted following activation.

Primary relay connected to the function enable switch as employed herein means a connection that is capable of sending a signal between the control module and the function enable switch. Generally, the signal will be a signal to deactivate or override the function enable switch, that is, to cut electrical supply and prevent movement of the basket or cage.

Secondary relay connected to the emergency switch as employed herein means a connection that is capable of sending a signal between the control module and the emergency switch. Generally, the signal will be a signal to activate the emergency switch, that is, to cut electrical supply and prevent movement of the basket or cage.

Programmable control module as employed herein refers to a component of the safety device which controls the interactions between components. Advantageously the control module can be programmed to perform certain actions on receipt of a given signal. For example, on triggering of the switch activation device the control module will send a signal to deactivate or override the function enable device, to double check whether the signal worked to cut power to the controls and if not to send a second signal to the emergency switch. It will also activate the alarm. Similarly, if the reset button is activated within a given period of time the control module will reset the safety device and allow the controls to be functional again.

A further advantage of the programmable control module is that it can be expanded to incorporate additional "modules" such as additional safety monitoring devices, a data recording device etc.

In one embodiment the control module is further programmed to perform a self-diagnostic test when the safety device is first turned on and if it fails the diagnostic a warning system is activated.

Self-diagnostic as employed herein means the process of diagnosing, or identifying the status of each component in the safety device. Typically the process involves checking that power is supplied to each component.

Warning system as employed herein means a different alarm pattern to the emergency alarm seen when the safety device is triggered by the switch activation device. In one embodiment the warning system does not cut power to the controls meaning that the operator can chose to ignore the warning and operate the aerial lift without the safety device being fully functional. Advantageously, the warning system alerts the operator to the fact that the safety device is not working so that the operator can take alternate precautions.

In one embodiment the SOS alarm has a duration of 30 seconds or less, for example 29, 28, 27, 26, 25, 24, 23, 22, 21, 20, 19, 18, 17, 16, 15, 14, 13, 12, 11, 10, 9, 8, 7, 6, 5, 4, 3, 2 or 1 second. Such as 10 seconds.

In one embodiment the control module is further programmed to delay activation of cutting the electrical supply to the function enable switch upon activation of the switch activation device.

Delay activation as employed herein refers to a delay between receiving the activation signal from the switch activation device and sending the signal to deactivate the function enable switch. Advantageously, employing a delay means that the sensitivity of the switch activation device can be fine tuned to reduce the number of accidental activations. By employing a delay it is possible to accidentally activate the switch activation device and remove the activating signal quickly enough that the safety device is not activated. For example, the operator can brush against the switch activation device without cutting power to the controls. A delay may be up to approximately 0.5 seconds such as 0.1, 0.2, 0.3, 0.4 seconds, for example 0.4 seconds.

In one embodiment the delay is approximately 0.4 seconds.

In one embodiment the aerial lift has a control box and the control module is housed within the aerial lift's control box.

Housed within as employed herein means that the control module is arranged to have suitable dimensions that is can fit entirely within the control box of the aerial lift. This is a significant improvement over the prior art which had to be housed outside of the control box, therefore taking up more space within the basket. Advantageously, having dimensions to fit inside the control box means that the control module is smaller and lighter than the prior art, this is important particularly because aerial lifts have a maximum load that can be lifted. A further advantage of housing the control module within the control box is that it cannot be accessed and tampered with as easily as the prior art.

In one embodiment additional modules can be plugged into the control module.

Additional modules as employed herein refers to modular units that can be connected to the present safety device to extend or improve its usefulness. Such modules include, but are not limited to, additional sensors and data collection devices.

Plugged into the control module as employed herein refers to the intention that such module will be easily connectable by the unskilled person or a person with minimal training.

In one embodiment the safety device of the present disclosure further comprises an information link to a data collection device.

Information link as employed herein refers to the transmission of data from the control module to the data collection device. Any suitable means of transmission is intended to be covered including physical cabling, such as ethernet, or wireless transmission including radio, wifi and Bluetooth etc.

Data collection device as employed herein refers to a "black box" type recorder intended to record information about collisions and entrapments or near collisions/entrapments, operator data, results of the self-diagnostic test among other things.

In the context of this specification "comprising" is to be interpreted as "including".

Aspects of the disclosure comprising certain elements are also intended to extend to alternative embodiments "consisting" or "consisting essentially" of the relevant elements.

Where technically appropriate, embodiments of the invention may be combined.

Embodiments are described herein as comprising certain features/elements. The disclosure also extends to separate embodiments consisting or consisting essentially of said features/elements.

Technical references such as patents and applications are incorporated herein by reference.

Any embodiments specifically and explicitly recited herein may form the basis of a disclaimer either alone or in combination with one or more further embodiments.

The invention claimed is:

1. A safety device for an aerial lift having a basket or cage with controls which permit an operator standing in the basket or cage to manoeuvre the basket or cage, the controls comprising:

an emergency switch which normally allows the flow of electricity and is operable to stop electrical supply and prevent movement of the basket or cage;

a function enable switch which is normally open to cut electrical supply and prevent movement of the basket or cage and must be held closed by the operator to allow the flow of electricity and enable the operator to operate the controls;

an alarm which is either audible, visual or audible and visual;

a switch activation device proximate to the controls;

a primary relay connected to the function enable switch;

a secondary relay connected to the emergency switch; and the primary and secondary relays being controlled by a programmable control module connected to the switch activation device, the function enable switch, and the alarm, wherein the control module is programmed to prevent movement of the basket or cage and activate the alarm by cutting electrical supply to the function enable switch when the function enable switch is closed and the switch activation device is activated, and wherein if the electrical supply to the function enable switch cannot be cut, the control module is further programmed to prevent movement of the basket or cage and activate the alarm by operating the emergency switch to cut the electrical supply.

2. A safety device according to claim 1 wherein the function enable switch is a foot switch or a dead man's handle.

3. A safety device according to claim 1 wherein the alarm is located on an underside of the basket or cage.

4. A safety device according to claim 1 wherein the aerial lift has a horn and the alarm is an audible alarm which utilises the horn.

5. A safety device according to claim 4 wherein the horn sounds a unique sounding pattern.

6. A safety device according to claim 4 wherein the alarm is linked to the horn via a serial communications lead.

7. A safety device according to claim 1 wherein the alarm is visual and flashes for a period of time when the safety device is activated.

8. A safety device according to claim 1 wherein the control module is further programmed to perform a self-diagnostic test when the safety device is first turned on and a warning system is activated if the self-diagnostic test is failed.

9. A safety device according to claim 1 wherein the switch activation device is a pressure sensitive safety edge.

10. A safety device according to claim 9 wherein the pressure sensitive safety edge is held in position by a clamp.

11. A safety device according to claim 1 further comprising a switch activation device reset switch connected to the control module.

12. A safety device according to claim 11 wherein the reset switch is located on the controls of the aerial lift.

13. A safety device according to claim 1 wherein the control module is further programmed to delay activation of cutting electrical supply to the function enable switch upon activation of the switch activation device.

14. A safety device according to claim 13 wherein the delay is approximately 0.4 seconds.

15. A safety device according to claim 1 further comprising an information link to a data collection device.

16. A safety device according to claim 1 wherein additional modules can be plugged into the control module.

17. A safety device according to claim 1 wherein the aerial lift has a control box and the control module is housed within the control box.

18. An aerial lift comprising a safety device according to claim 1.

* * * * *